April 12, 1949.     W. P. MASON     2,467,325
ELECTROOPTICAL LIGHT VALVE OF AMMONIUM
DIHYDROGEN PHOSPHATE CRYSTAL
Filed Dec. 31, 1946     2 Sheets-Sheet 1
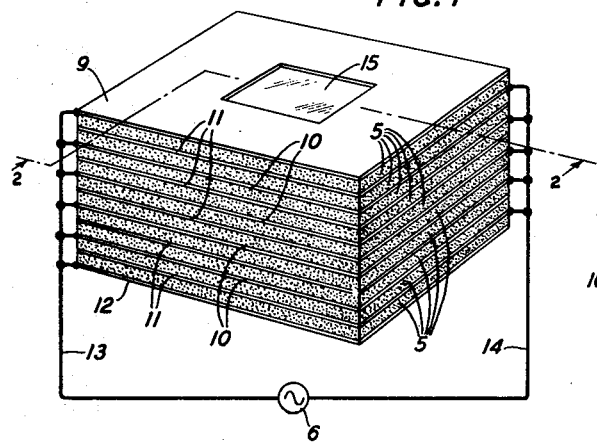
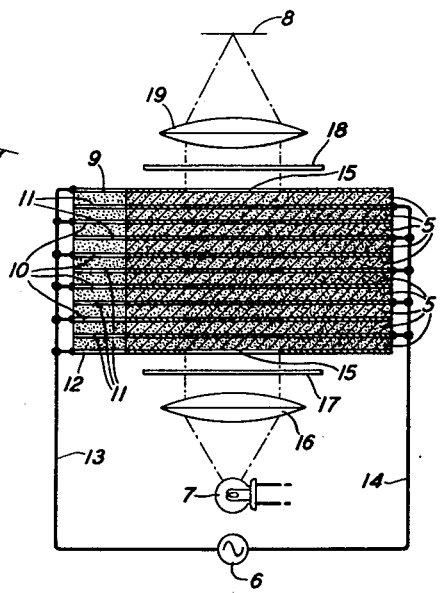
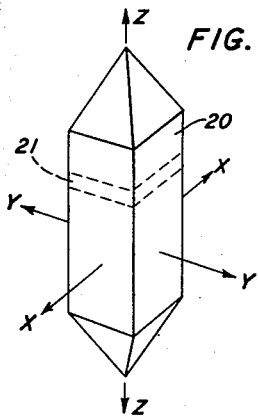
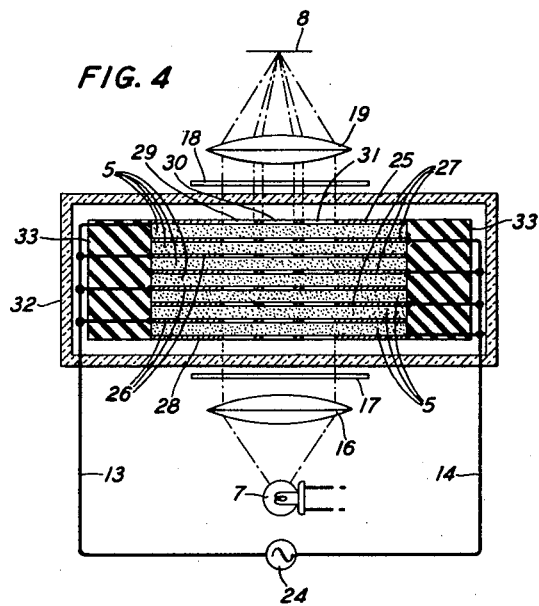
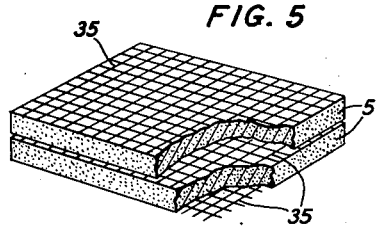
INVENTOR
W. P. MASON
BY
*Stanley B. Kent*
ATTORNEY April 12, 1949.    W. P. MASON    2,467,325
ELECTROOPTICAL LIGHT VALVE OF AMMONIUM
DIHYDROGEN PHOSPHATE CRYSTAL
Filed Dec. 31, 1946    2 Sheets-Sheet 2
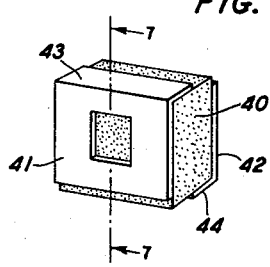
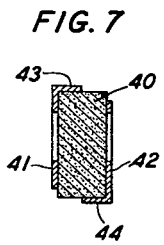
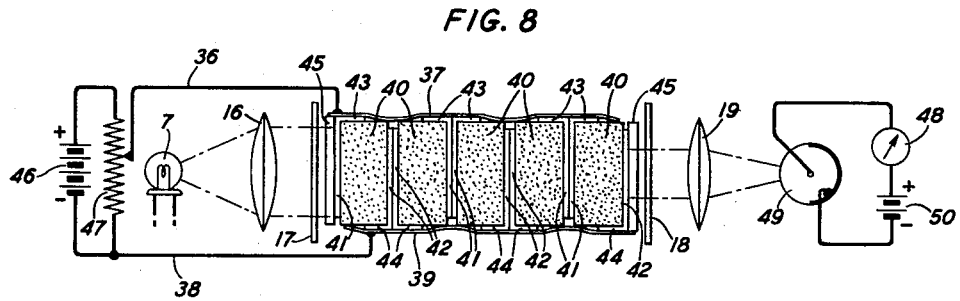
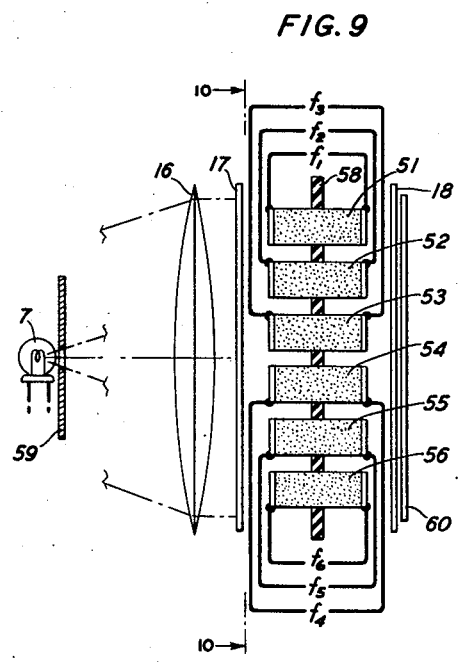
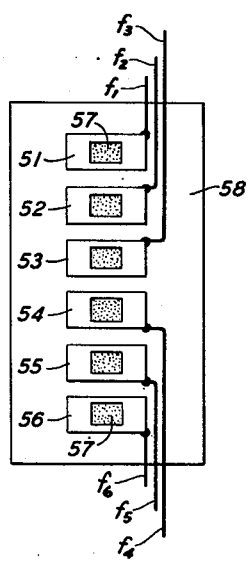
INVENTOR
*W. P. MASON*
BY
*Stanley B. Kent*
ATTORNEY Patented Apr. 12, 1949

2,467,325

UNITED STATES PATENT OFFICE 2,467,325

ELECTROOPTICAL LIGHT VALVE OF AMMONIUM DIHYDROGEN PHOSPHATE CRYSTAL

Warren P. Mason, West Orange, N. J., assignor to Bell Telephone Laboratories, Incorporated, New York, N. Y., a corporation of New York Application December 31, 1946, Serial No. 719,585

16 Claims. (Cl. 88—61)

This invention relates to electrooptical apparatus and more particularly to light valves comprising crystals of ammonium dihydrogen phosphate.

An object of the invention is to provide an improved device for controlling light electrically.

A more specific object is to provide a light valve comprising one or a plurality of ammonium dihydrogen phosphate crystals.

Crystals of ammonium dihydrogen phosphate are commonly known as ADP crystals. Such terminology will be used hereinafter for the sake of brevity when referring to such crystals. The chemical symbol for ammonium dihydrogen phosphate is $NH_4H_2PO_4$.

In an example of practice of this invention a plurality of plates cut from a normal crystal are provided with electrodes and assembled in a pile to control a beam of polarized light in accordance with an electrical potential applied to the electrodes. Each plate is a so-called Z-cut crystal, the major surfaces of which are normal to the Z axis of the crystal. The major surfaces of each plate are substantially parallel to each other and separated by a distance which is relatively small compared to the dimensions of the surfaces. The electrodes are applied to the major surfaces and have aligned apertures through which the polarized light may pass in a direction substantially parallel to the Z axis. The plurality of plates are assembled in a pile with the apertures of all of the electrodes in alignment and an electrode of one plate in contact with an electrode of an adjacent plate, the plates being so arranged that with the adjacent electrodes at the same potential the polarized light beam passing through the crystals is delayed in the same direction in adjacent plates. The action is to delay the ordinary ray compared to the extraordinary ray so that the two do not cancel for a polarized beam. The polarized light beam may be produced in any well-known manner as by a collimating lens which gathers light from a concentrated source of light and directs the rays through a sheet of polarizing material and the aligned apertures in the pile of plates. The beam of polarized light after passing through an analyzer is concentrated by another lens and directed to a utility such as an observing screen, a light sensitive photographic emulsion or a photoelectric or light sensitive electric device.

The electrodes may consist of metallic sheets with apertures or metallic plating on the major surfaces of the plates or mesh types of metallic electrodes secured to, or formed on, the major surfaces of the plates. A single electrode may serve for adjacent major surfaces in the pile of plates. The electrodes may extend to a portion of the minor surfaces of the plates such as opposite minor surfaces to facilitate the connection of external conductors.

If a space is left between the plates after assembling in the pile at the location of the apertures, the major surfaces of the plates should be optically flat to obviate distortion of the polarized light beam. However, if such space is filled with a substance having susbtantially the same index of refraction as the crystal, it is not necessary to provide optically flat major surfaces. Obviously, the use of such a substance greatly reduces the cost of grinding and polishing the crystal plates.

In a modified example of practice, a plurality of ADP plates are arranged side by side with their optical paths in the direction of the Z axes substantially parallel. An opaque screen or baffle transverse to the optical paths is placed between and around the several plates. Light from a single source is gathered by a collimating lens and directed through a sheet of polarizing material and the several plates in parallel. The emergent beams then pass through an analyzer and may be used in any desired manner. In this arrangement each plate may be energized from a separate source of electrical signaling voltage.

A decided advantage of the ADP crystal for the controlling of light is that a much greater retardation of the light is obtained for a given electric stress than for any crystals heretofore known, such as quartz, for example. Therefore, the voltage necessary to effect a given retardation may be greatly reduced or the length of the optical path through the crystal may be shortened, reducing the size of the light valve.

If the controlling voltage comprises a single frequency or a narrow band of frequencies, the natural resonance of the crystal plate or plates may be utilized to obtain large sensitivity. If the controlling voltage comprises a wide range of frequencies, then it becomes advantageous to have the piezoelectric resonances cancelled out as by embedding the plates in, or cementing them to, a plastic or damping material such as pitch. If this material has about the same impedance as the crystal, any waves set up in the crystal will be transmitted unimpeded into the damping material and will be dissipated. In a modified example of practice of the invention a pile of ADP crystal plates provided with damping material and three sets of aligned apertures are mounted in a container of transparent liquid which has substantially the same index of refraction as the ADP crystal plates. The walls of the container, at least the portions opposite the apertures, are transparent to the polarized light which it is desired to control.

The invention will now be described more in detail having reference to the accompanying drawings.

Fig. 1 is a perspective view of a pile of ADP crystal plates having an electric source, shown schematically, connected to the electrodes of said plates.

Fig. 2 is a view of the arrangement of Fig. 1 partially in section along the line 2—2 looking in the direction of the arrows in combination with optical elements for producing and utilizing polarized light.

Fig. 3 illustrates an ADP crystal from which plates suitable for use in this invention may be cut.

Fig. 4 shows a modified form of this invention comprising a pile of ADP crystal plates provided with vibration damping material and immersed in a liquid having the same index of refraction as the crystal and a plurality of sets of aligned apertures forming parallel light paths.

Fig. 5 illustrates two ADP plates provided with electrodes in the form of grids.

Fig. 6 is a perspective view of an ADP crystal plate with apertured electrodes, portions of which are on surfaces of the crystal other than major surfaces.

Fig. 7 is a cross section of the plate of Fig. 6.

Fig. 8 shows schematically an electrooptical system for controlling the illumination of a photoelectric cell comprising a plurality of ADP crystal plates of the kind illustrated in Figs. 6 and 7.

Fig. 9 is a schematic arrangement of a plurality of ADP crystal plates adapted to be energized from a plurality of electrical sources to control a plurality of light beams from a common source.

Fig. 10 is a cross section of Fig. 9 along the line 10—10 looking in the direction of the arrows.

The same reference characters are used to represent identical elements in the several figures of the drawing.

In Figs. 1 and 2, a light valve is shown comprising ten ADP crystal plates 5 in a pile with electrical connections from a source of alternating current 6 and an optical system for directing light from a source 7 through the plates 5 to a receiving utility 8. The number of plates shown in the drawing is merely for purposes of illustration, it being understood that a greater or lesser number may be used as desired. The plates 5 on their major surfaces are provided with electrodes 9, 10, 11 and 12. These electrodes are preferably intimately joined to the crystal plates. The electrodes may be cemented to the plates by means of a transparent glue such as Canada balsam which has an index of refraction slightly higher than the ADP crystals along the optic axis. The crystal plates 5 are oppositely poled, one terminal of the source 6 being connected by conductor 13 to electrodes 9, 10 and 12 and the other terminal by the conductor 14 to electrodes 11. For ADP crystals the direction of the optic axis is the same as the applied electric field to effect retardation of light. Therefore the electrodes used for applying the electric stress must have light paths therethrough. Electrodes 9, 10, 11 and 12, therefore are provided with apertures 15. The spaces between the crystals 5 over the area of the apertures 15 are filled with Canada balsam. With this arrangement it is necessary that the major surfaces of the crystal plates be substantially optically flat so that scattering of light will not take place.

The optical system comprises the source of light 7, a collimating lens 16, a polarizer 17, an analyzer 18, a concentrating lens 19 and a light sensitive utility 8 such as a moving strip of photographic film upon which the lens 19 focusses the light which passes the analzer 18 when the plates 5 are subjected to an electrical stress. The dot and dash lines extending from the light source 7 to the film 8 represent the boundary rays of the beam of light rays passing through the apertures 15.

An advantage of using a plurality of crystal plates 5 in a pile is that for a given voltage a relatively long light path through the crystal material and a high potential gradient may be obtained. In order to realize the maximum light effect, the light delay should be one half wavelength of the light which is used. Since the light delay is proportional to the electrooptical constant along the optic axis multiplied by the voltage, the optimum desired delay may be obtained if the full voltage is applied in parallel to a plurality of crystal plates with the light traversing all of the plates in series or tandem. Such an arrangement is shown in Figs. 1 and 2.

The method of cutting the crystals of ADP to obtain the plates 15 of Figs. 1 and 2 is illustrated in Fig. 3. The ADP crystallizes in the tetragonal scalenohedral class with the habit shown in Fig. 3. The Z axis lies along the long direction of the crystal 20. The X and Y axes lie normal to the prism faces. The plates 15 are sections of the crystal 20 such as the section 21 between the planes represented by the dotted lines in Fig. 3. The major faces of the plates 15 correspond to planes in the crystal 20 which are perpendicular to the Z axis of the crystal 20 from which they are cut. The edges of the plates 15 correspond preferably to the parallel faces of the prism 20 or to planes parallel to the faces of the prism 20 from which they are cut. However, the edges may correspond to other planes if desired.

In Fig. 4 a modified form of ADP light valve is shown which is substantially uniformly responsive to alternating current comprising a wide range of frequencies and in which the need for optically flat surfaces for the major faces of the crystal plates is obviated. In the specific arrangement illustrated seven plates 5 are used. A greater or lesser number may be used as the occasion warrants. These plates 5 are provided on their major surfaces with electrodes 25, 26, 27 and 28. Electrodes 25 to 28 differ from the electrodes 9 to 12 of Figs. 1 and 2 by having a plurality of light transmitting apertures 29, 30 and 31 instead of a single aperture 15. The crystal pile is mounted in a liquid tight container 32 of glass or other suitable material and immersed in a liquid which matches the index of refraction of the crystal plates. The plates are separated by small spaces at the position of the apertures which space is filled by the index matching liquid. In view of this index matching condition the faces of the plates 5 do not have to be polished to prevent scattering of the light passing therethrough. In order to make this light valve substantially equally sensitive over a wide frequency range, the piezoelectric resonances must be eliminated. This is accomplished by embedding the edges of the crystals in, or gluing them to, a plastic or damping material 33 such as pitch. If this material has about the same impedance as the crystal any wave set up in the crystal will be transmitted unimpeded into the damping material 33 and will be dissipated. In this way the frequency range to which the light valve is substantially equally sensitive can be made very large. Such a light valve is suitable for controlling light for the production of television images. Obviously such a light valve can also be used for controlling light in systems operating with smaller frequency ranges. A source of voltage 24 capable of supplying voltages of a wide range of frequencies is connected by conductors 13 and 14 to the electrodes 25 to 28. An optical system suitable for use with the ADP light valve of Fig. 4 is identical with the system illustrated by Fig. 2 comprising the light source 7, collimating lens 16, polarizer 17, analyzer 18, concentrating lens 19 and light sensitive utility 8.

In Fig. 5 a modified form of electrode is shown which may be substituted for the electrodes 9 to 12 of Figs. 1 and 2 and the electrodes 25 to 28 of Fig. 4. Such modified electrodes are shown in Fig. 5 in their relationship to two only adjacent crystal plates 5. It is obvious from Fig. 5 how such electrodes would be applied to any number of additional plates 5. Each electrode is in the form of a grid 35 of conductive material secured to the major face or faces of one or both of the adjacent crystal plates 5. The grid 35 may consist of a metallic mesh of wires or ribbons or it may consist of a metallic coating applied as a paint on the faces of the crystals. The grid 35 may also be applied by sputtering or by any other known electrical coating process.

In ADP light valves of the kind described hereinbefore, the delay of the light wave in passing through the crystal plates along the optic axis in centimeters is given by the equation:

$$\text{Light delay} = \frac{P \times E \times W}{300\, l_t} \quad (1)$$

where P is the electrooptical constant of the crystal plates, E is the applied voltage, W is the length of the light path through the crystals along the optic axis and $l_t$ is the thickness of each crystal plate across which the applied voltage is impressed. In order to obtain the maximum light effect, the light delay must be one half wavelength of the light used. In order to indicate the voltage required to obtain maximum light effect in a light valve of the kind illustrated in Figs. 1 and 2, let it be assumed that the crystal pile is composed of 50 crystal plates 5 each one millimeter thick. The total light path length is 5 centimeters. For an electrooptical constant of $30 \times 10^{-8}$ for the ADP crystal plates and for sodium light having a wavelength of approximately 6,000 Angstrom units or $6,000 \times 10^{-8}$ centimeters, the voltage required is obtained from Equation 1 as follows:

$$3,000 \times 10^{-8} = \frac{30 \times 10^{-8} \times E \times 5}{300 \times 0.1} \quad (2)$$

or $$E = 600 \text{ volts} \quad (3)$$

The capacity of such a unit is approximately 2,790 micromicrofarads.

In Figs. 6 and 7 another form of electrode is illustrated. The crystal plate 40 is coated on one major face with an apertured electrode 41 and an extension 43 on a portion of the upper edge which extension may be used as a terminal for electrode 41. The other major face of the crystal plate 40 is coated with an apertured electrode 42 and an extension 44 on the lower edge which extension may likewise be used as a terminal for the electrode 42. Such terminal coatings facilitate the assembling of the crystal plates 40 into a pile of plates arranged in tandem with respect to the light path in the direction of the Z axis. As stated hereinbefore the major surfaces of the plates 40 are substantially perpendicular to the Z axis. Any plating process may be used so long as it results in suitably conductive electrodes and terminal extensions. A silver and Vinylite conducting paint has been found to be suitable.

A plurality of coated plates 40 of the kind illustrated and described in connection with Figs. 6 and 7 may be assembled to form a light valve of the form illustrated in Fig. 8. The plates 40 are assembled side by side with the electrodes 41 of adjacent plates cemented together and the terminals 43 in substantially the same plane which may be, for example, the top of the light valve as illustrated in Fig. 8 and with the electrodes 42 of adjacent plates cemented together and the terminals 44 in substantially the same plane at the bottom of the light valve. Cover glasses 45 are cemented to the electrodes 41 and 42 at opposite ends of the pile of plates 40. During assembly, the spaces between adjacent plates 40 and the end plates 40 and the cover glasses 45 formed by the apertures in the electrodes are filled with an oil which has substantially the same index of refraction as the ADP crystal plates 40. This filling of index matching oil substantially prevents scattering of the light at the spaces even though the crystal plates 40 are not polished to an optically flat surface at the apertures and obviates the necessity for providing optically flat surfaces for the crystal plates 40. The external surfaces of the cover glasses 45, at least in the region of the adjacent apertures, are optically flat surfaces. The optical system comprising light source 7, collimating lens 16, polarizer 17, analyzer 18 and converging lens 19 is substantially the same as the optical system described in connection with Fig. 2 and Fig. 4. Polarizing material known as "Polaroid" is suitable for the polarizer 17 and the analyzer 18 but other well known polarizing materials may be used. The polarizing "Polaroid" sheet 17 is set so that the plane of polorization lies along either the Y or X axis while the analyzer "Polaroid" sheet 18 has its plane of polarization at 90 degrees from the plane of polarization of the polarizing sheet 17 or along the X axis when the plane of polarization of the polarizer is along the Y axis and along the Y axis when the plane of polarization of the polarizer is along the X axis. In the arrangement of Fig. 8 a variable voltage from a source of voltage such as the battery 46 may be impressed across the plates 40 in parallel by means of the potentiometer 47. Conductor 36 extends from the movable contact of potentiometer 47 to a tinfoil connector 37 which makes contact along the top of the light valve with the terminals 43 of the electrodes 41 of the plates 40. Conductor 38 connects the negative terminal of the battery 46 and potentiometer 47 with a tinfoil connector 39 which makes contact along the bottom of the light valve with the terminal extensions 44 of the electrodes 42 of the plates 40. The effect of such variable voltage on the transmission of light through the light valve is indicated by the reading of an ammeter 48, the reading of which is dependent upon the illumination of a photoelectric cell 49 which is connected in series with a source of current such as the battery 50 and the ammeter 48. The illumination of the photoelectric cell 49 is dependent upon the amount of light from the source 7 which passes through the analyzer 18 which in turn is dependent upon the electric stress along the Z axis of the crystal plates 40.

The photoelectric cell 49 and ammeter 48 may be replaced by a Macbeth illuminator or any other suitable illumination indicating means for measuring the magnitude of the electrooptical effect of the light valve of Fig. 8. The light valve in Fig. 8 may be used in other ways for producing a variable light in response to a variable voltage. The source of variable voltage may be substituted for the battery 46 and the potentiometer 47 and any desired light utilizing element may be substituted for the photoelectric cell 49, ammeter 48 and battery 50.

A modified form of light valve comprising ADP crystals is illustrated in Figs. 9 and 10. This arrangement is designed to indicate the presence of current in any one or a plurality of six channels represented by the circuits $f_1$, $f_2$, $f_3$, $f_4$, $f_5$ and $f_6$. These circuits are connected respectively to electrodes on ADP crystals 51 to 56, the electrodes being provided with apertures 57. These crystals are so cut that the Z axes extend parallel to the long sides of the crystals as illustrated in Fig. 9. The apertures 57 are illustrated in Fig. 10. Crystals 51 to 56 are mounted with a light baffle 58 surrounding them and perpendicular to the optic axes of the crystals 51 to 56 so as to prevent light rays from the source 7 passing to the right-hand side of the baffle 58 as seen in Fig. 9 except through the crystals. The optical system used with the crystals 51 to 56 comprises a light source 7, a baffle 59 having an aperture therethrough, a collimating lens 16, a "Polaroid" polarizer 17 and a "Polaroid" analyzer 18. This optical system is very much like the optical systems of Figs. 2, 4 and 8. The polarizer 17 and analyzer 18 are so oriented that no light passes through the analyzer 18 when the crystal is unstrained. The presence of current in any one or a plurality of the channels $f_1$ to $f_6$ is indicated by the passage of light through the analyzer 18 in the vicinity of the crystal to which the energized channel or channels are connected. The presence of the light may be made visible to an observer by means of a ground glass plate 60 or the presence of the light may be utilized in any other desired manner. Obviously, a greater or a lesser number of crystals may be used in the arrangement of Figs. 9 and 10, depending upon the number of electrical channels which it is desired to utilize.

From the foregoing description it is obvious that the invention may find embodiment in a variety of arrangements not specifically described hereinbefore. Such embodiments also come within the purview of the appended claims.

What is claimed is:

1. A light valve comprising a slice of ammonium dihydrogen phosphate crystal having two substantially plane faces substantially perpendicular to the optic axis, and electrodes adjacent said faces respectively having light-transmitting apertures aligned in the direction of the optic axes.

2. A light valve comprising a plurality of plates of ammonium hihydrogen phosphate, each plate having two substantially plane faces substantially perpendicular to the optic axis of the crystal from which the said plate was obtained and said plurality of plates being arranged in a pile with the faces parallel, and apertured electrodes adjacent to the faces respectively of all of said plates, said apertures being aligned for the passage of light through the plates in the direction of the optic axes.

3. A light valve comprising a plurality of plates of ammonium dihydrogen phosphate, each plate having two substantially plane faces substantially perpendicular to the optic axis of the crystal from which the said plate was obtained and said plurality of plates being arranged in a pile with the faces parallel, and apertured electrodes adjacent to the faces respectively of all of said plates, each electrode having a plurality of apertures and the apertures being aligned in a corresponding plurality of sets of apertures for the passage of light through the plates in the direction of the optic axes.

4. A light valve comprising a plurality of plates of ammonium dihydrogen phosphate, each plate having two substantially plane faces substantially perpendicular to the optic axis of the crystal from which the said plate was obtained and said plurality of plates being arranged in a pile with the faces parallel, and apertured electrodes in the form of metallic grids adjacent to the faces respectively of all of said plates.

5. A light valve comprising a plurality of plates of ammonium dihydrogen phosphate, each plate having two substantially plane faces substantially perpendicular to the optic axis of the crystal from which the said plate was obtained and said plurality of plates being arranged in a pile with the faces parallel, apertured electrodes adpacent to the faces respectively of all of said plates for the passage of light through the plates in the direction of the optic axes, and a material having an index of refraction substantially the same as the index of refraction of the said plates filling the spaces between adjacent plates at the apertures in said electrodes.

6. A light valve comprising a slice of ammonium dihydrogen phosphate crystal having two optically flat faces substantially perpendicular to the optic axis, and light transmitting electrodes adjacent said faces respectively.

7. A light valve comprising an ammonium dihydrogen phosphate crystal having two substantially plane faces substantially perpendicular to the optic axis of said crystal, and apertured electrodes adjacent said respective faces, each said electrode having a terminal extension adjacent another face of said crystal, said apertures being aligned for the transmission of light through the crystal in the direction of the optic axis.

8. A light valve comprising an ammonium dihydrogen phosphate crystal having two substantially plane faces substantially perpendicular to the optic axis of said crystal, and apertured electrodes adjacent said respective faces, each electrode having a terminal extension adjacent another face of said crystal which is opposite to the face to which the terminal extension of the other electrode is adjacent, said apertures being aligned for the transmission of light through the crystal in the direction of the optic axis.

9. A light valve comprising a plurality of ammonium dihydrogen phosphate crystals, each crystal having two substantially plane faces substantially perpendicular to the optic axis of said crystal, and apertured electrodes adjacent said respective faces, each said electrode having a terminal extension adjacent another face of said crystal, said crystals being arranged in a pile with electrodes of the same polarity adjacent one another and the terminal extensions of the same polarity located in substantially the same plane, and metallic conductors contacting respectively all of the terminal extensions of the same polarity.

10. A light valve comprising a plurality of ammonium dihydrogen phosphate crystals, each crystal having two substantially plane faces substantially perpendicular to the optic axis of said crystal, and apertured electrodes adjacent said respective faces, each said electrode having a terminal extension adjacent another face of said crystal, said crystals being arranged in a pile with electrodes of the same polarity adjacent one another and the terminal extensions of the same polarity located in substantially the same plane, metallic conductors contacting respectively all of the terminal extensions of the same polarity, and a material having substantially the same index of refraction as the ammonium dihydrogen phosphate crystals filling the spaces between the crystals at the location of the apertures.

11. A light valve comprising a plurality of ammonium dihydrogen phosphate crystals, each crystal having two substantially plane faces substantially perpendicular to the optic axis of said crystal, and apertured electrodes adjacent said respective faces, each said electrode having a terminal extension adjacent another face of said crystal, said crystals being arranged in a pile with electrodes of the same polarity adjacent one another and the terminal extensions of the same polarity located in substantially the same plane, metallic conductors contacting respectively all of the terminal extensions of the same polarity, means cementing together the adjacent crystals in the said pile, cover glasses cemented over the apertures respectively of the electrodes of the end crystals in the pile, and a transparent oil filling the spaces between adjacent crystals and between the cover glasses and the respective crystal adjacent thereto at the location of the apertures.

12. A light valve comprising a plurality of ammonium dihydrogen phosphate crystals, each having two substantially plane faces substantially perpendicular to the optic axis of the crystal and apertured electrodes adjacent to the said faces respectively of all of said crystals, said crystals being arranged side by side with their optic axes substantially parallel, and a light baffle transverse to the optic axes of and surrounding said crystals to stop light rays traveling in the direction of the optic axes of said crystals in paths outside the crystals.

13. A device for delaying the travel of light waves comprising a Z-cut crystal plate of ammonium dihydrogen phosphate, and light transmitting electrodes adjacent to the major faces respectively of said crystal plate.

14. An electrooptical system comprising a light valve including a plurality of plates of ammonium dihydrogen phosphate, each plate having two substantially plane faces substantially perpendicular to the optic axis of the crystal from which the said plate was obtained and said plurality of plates being arranged in a pile with the said faces parallel, apertured electrodes adjacent to the faces respectively of all of said plates, said apertures being aligned for the passage of light through the plates in the direction of the optic axes, sheets of polarizing material over the said apertures at respectively opposite ends of said pile, a light source, a collimating lens directing light from said source into the crystals of said pile through one of said sheets of polarizing material, and means to utilize the light emerging from the crystals of said pile through the second of said sheets of polarizing material.

15. A light valve comprising a crystal of ammonium dihydrogen phosphate having two substantially plane faces substantially perpendicular to the optic axis, light-transmitting electrodes adjacent to said faces respectively, and damping material secured to said crystal to substantially absorb waves set up in said crystal.

16. A light valve comprising a crystal of ammonium dihydrogen phosphate having two substantially plane faces substantially perpendicular to the optic axis, light-transmitting electrodes adjacent to said faces respectively, and plastic material having approximately the same impedance as the crystal to waves set up in the crystal secured to one or more faces of said crystal other than the said faces which are perpendicular to the optic axis whereby waves set up in the crystal are damped by being dissipated in the said plastic material.

WARREN P. MASON.

REFERENCES CITED

The following references are of record in the file of this patent:

UNITED STATES PATENTS

| Number | Name | Date |
|--------|------|------|
| 1,476,102 | Pickard | Dec. 4, 1923 |

---

Disclaimer 2,467,325.—*Warren P. Mason*, West Orange, N. J. ELECTROOPTICAL LIGHT VALVE OF AMMONIUM DIHYDROGEN PHOSPHATE CRYSTAL. Patent dated Apr. 12, 1949. Disclaimer filed Oct. 19, 1950, by the assignee, *Bell Telephone Laboratories, Incorporated*.

Hereby enters this disclaimer to claims 1 and 13 of said patent.
[*Official Gazette November 28, 1950.*]